(12) United States Patent
Kurokawa

(10) Patent No.: US 10,707,764 B2
(45) Date of Patent: Jul. 7, 2020

(54) POWER APPARATUS

(71) Applicant: FUJITSU LIMITED, Kawasaki-shi, Kanagawa (JP)

(72) Inventor: Fujio Kurokawa, Nagasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/515,660

(22) Filed: Jul. 18, 2019

(65) Prior Publication Data

US 2020/0044570 A1 Feb. 6, 2020

(30) Foreign Application Priority Data

Aug. 2, 2018 (JP) .................................. 2018-146187

(51) Int. Cl.
*H02M 3/335* (2006.01)

(52) U.S. Cl.
CPC ... *H02M 3/33515* (2013.01); *H02M 3/33569* (2013.01)

(58) Field of Classification Search
CPC ............. H02M 3/335; H02M 3/33507; H02M 3/33515; H02M 3/33523; H02M 3/33538; H02M 3/33546; H02M 3/33553
See application file for complete search history.

(56) References Cited

U.S. PATENT DOCUMENTS

| | | | |
|---|---|---|---|
| 2004/0113594 A1* | 6/2004 | Athari | H02M 1/4225 323/222 |
| 2017/0126135 A1* | 5/2017 | Sugawara | H02M 1/08 |
| 2018/0026532 A1* | 1/2018 | Mizuno | H02M 3/156 323/282 |
| 2018/0234007 A1* | 8/2018 | Xu | H02M 3/33523 |

FOREIGN PATENT DOCUMENTS

JP   2000-14143   1/2000

* cited by examiner

*Primary Examiner* — Gary L Laxton
(74) *Attorney, Agent, or Firm* — Staas & Halsey LLP

(57) ABSTRACT

A power apparatus includes a power circuit configured to receive an input voltage and generate an output voltage, a memory, and a processor coupled to the memory and the processor configured to calculate an integral value of an error between the output voltage and a target voltage of the power circuit, calculate a duty ratio based on the integral value, the power circuit being controlled according to the calculated duty ratio so that the output voltage becomes the target voltage, calculate a slope of the integral value with respect to an output current of the power circuit, and generate a first warning signal when the calculated slope exceeds a first warning threshold in a case where the calculated slope is different from an initial value.

12 Claims, 12 Drawing Sheets

| $I_{out}$ [A] | $R_{loss}$ [Ω] |
|---|---|
| 0.1 | 10 |
| 1 | 1.8 |
| 2 | 0.7 |
| ⋮ | ⋮ |
| 42 | 0.12 |

| $I_{out}$ [A] | $N_I$ | $V_{out}$ [V] | $V_{in}$ [V] | $I_{in}$ [A] |
|---|---|---|---|---|
| 2 | $N_{I2}$ | 12.1 | 380 | 0.04 |
| ⋮ | ⋮ | ⋮ | ⋮ | ⋮ |
| 10 | $N_{I10}$ | 12.0 | 380 | 0.073 |
| ⋮ | ⋮ | ⋮ | ⋮ | ⋮ |
| 30 | $N_{I30}$ | 12.0 | 380 | 1.00 |

FIG. 11

INTEGRAL VALUE $N_I$ AT
1A (RATED MAXIMUM OUTPUT)

| INTERNAL LOSS R [Ω] | INTEGRAL VALUE $N_I$ |
|---|---|
| 0.126 | −9169 |
| 0.139 (+10%) | −10858 |
| 0.151 (+20%) | −12538 |
| 0.164 (+30%) | −15840 |

DIFFERENCE OF $N_I$

| |
|---|
| 1689 |
| 1680 |
| 3302 |

FIG. 12

SLOPE OF $N_I$

| INTERNAL LOSS R [Ω] | SLOPE OF INTEGRAL VALUE $N_I$ |
|---|---|
| 0.126 | −27438 |
| 0.139 (+10%) | −24041 |
| 0.151 (+20%) | −21319 |
| 0.164 (+30%) | −20974 |

DIFFERENCE OF SLOPE

| |
|---|
| 3397 |
| 2722 |
| 345 |

| DECELERATION AMOUNT | $N_I$ @$I_{out}$_0.5 A | SLOPE |
|---|---|---|
| 0 | 1327 | 20974 |
| 2 ns | 1493 | 20974 |
| 5 ns | 1727 | 20974 |
| 10 ns | 2527 | 20974 |
| 20 ns | 3328 | 20974 |

POWER APPARATUS

CROSS-REFERENCE TO RELATED APPLICATION

This application is based upon and claims the benefit of priority of the prior Japanese Patent Application No. 2018-146187, filed on Aug. 2, 2018, the entire contents of which are incorporated herein by reference.

FIELD

The embodiment discussed herein is related to a power apparatus.

BACKGROUND

In the related art, in a digitally controlled switching power supply, there is known a technique for detecting a breakdown of a power supply by detecting an equivalent series impedance of an output capacitor (for example, Japanese Laid-open Patent Publication No. 2000-14143).

SUMMARY

According to an aspect of the embodiments, a power apparatus includes a power circuit configured to receive an input voltage and generate an output voltage, a memory, and a processor coupled to the memory and the processor configured to calculate an integral value of an error between the output voltage and a target voltage of the power circuit, calculate a duty ratio based on the integral value, the power circuit being controlled according to the calculated duty ratio so that the output voltage becomes the target voltage, calculate a slope of the integral value with respect to an output current of the power circuit, and generate a first warning signal when the calculated slope exceeds a first warning threshold in a case where the calculated slope is different from an initial value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of the integral value;

FIG. 12 is a diagram illustrating an example of a slope of the integral value;

DESCRIPTION OF EMBODIMENTS

In the related art, it is difficult for a user to know deterioration of a power circuit before the power circuit breaks down.

Hereinafter, an embodiment of a technique for notifying deterioration of a power circuit before a failure will be described with reference to drawings.

Figure 1:
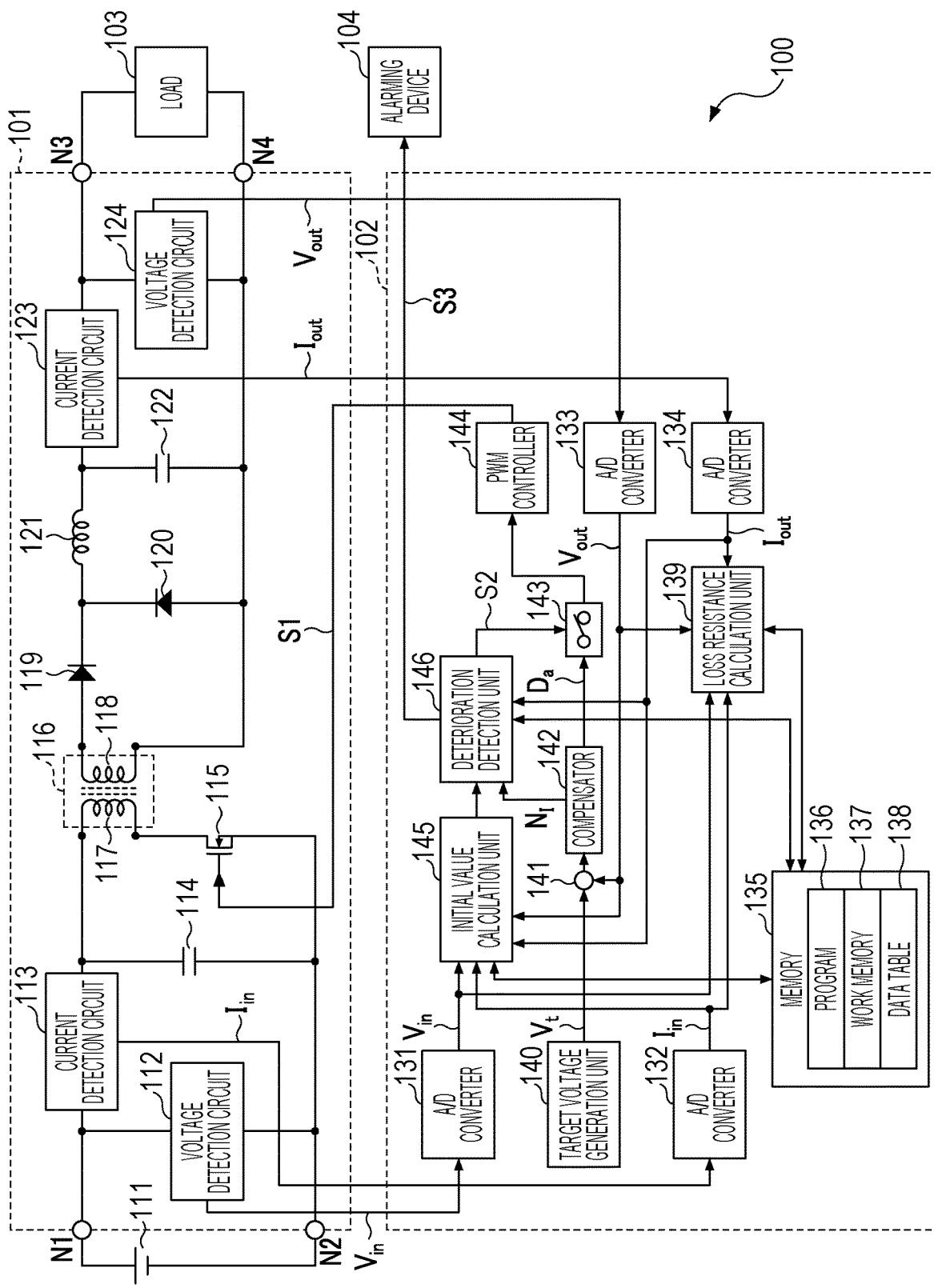
FIG. 1 is a diagram illustrating a configuration example of a power apparatus.

FIG. 1 is a diagram illustrating a configuration example of a power apparatus 100 according to the present embodiment. The power apparatus 100 includes a power circuit 101, a control device 102, a load 103, and an alarming device 104. The power circuit 101 includes a DC power supply 111, a voltage detection circuit 112, a current detection circuit 113, an electrolytic capacitor 114, an n-channel field effect transistor 115, a transformer 116, diodes 119 and 120, an inductor 121, an electrolytic capacitor 122, a current detection circuit 123, and a voltage detection circuit 124. The transformer 116 has a primary winding 117 and a secondary winding 118. The field effect transistor 115 is preferably a gallium nitride (GaN) high electron mobility transistor (HEMT) but may be a MOS field effect transistor. The HEMT has advantages of high capacity to resist pressure and high-speed switching. The power circuit 101 receives a DC input voltage $V_{in}$ of, for example, 380 V from the DC power supply 111, steps down the input voltage $V_{in}$, and outputs, for example, a DC output voltage $V_{out}$ of 12 V to the load 103. The load 103 is a server device or an electronic device. The turn ratio of the primary winding 117 and the secondary winding 118 is α:1. In high voltage power supplies, a usually takes a value greater than one.

The DC power supply 111 supplies a 380 V DC input voltage $V_{in}$, for example, between input nodes N1 and N2. The electrolytic capacitor 114 is connected between the input nodes N1 and N2, is charged to the input voltage $V_{in}$, and outputs the charged voltage. The primary winding 117 of the transformer 116 is connected between the input node N1 and the drain of field effect transistor 115. The field effect transistor 115 is a switching element, the gate is connected to a pulse width modulation (PWM) controller 144, and the source is connected to the input node N2. The field effect transistor 115 may be a plurality of field effect transistors connected in parallel. The secondary winding 118 is connected between the anode of the diode 119 and an output node N4. The diode 120 has an anode connected to output node N4 and a cathode connected to the cathode of the diode 119. The inductor 121 is connected between the cathode of the diode 119 and an output node N3. The electrolytic capacitor 122 is connected between the output nodes N3 and N4.

The transformer 116 transforms the voltage of the primary winding 117 and outputs the transformed voltage to the secondary winding 118. Specifically, when a voltage is applied to the primary winding 117, a voltage lower than the voltage of the primary winding 117 is generated in the secondary winding 118. The diodes 119 and 120 are rectifier circuits and rectify the voltage of the secondary winding 118. The inductor 121 and the electrolytic capacitor 122 are smoothing circuits, and smooth the voltage of the rectifying circuit, and output the smoothed voltage between the output nodes N3 and N4. The output voltage $V_{out}$ between the output nodes N3 and N4 is, for example, a DC voltage of 12 V, and is supplied to the load 103 as a power supply voltage.

A control signal S1 having a high frequency pulse is input to the gate of the field effect transistor 115. The control signal S1 is a gate voltage of the field effect transistor 115. The PWM controller 144 controls the pulse width of the control signal S1 of the field effect transistor 115. As will be described later, the PWM controller 144 widens the pulse width of the control signal S1 of the field effect transistor 115 if the output voltage $V_{out}$ is lower than a target voltage $V_t$ (for example, 12 V), and narrows the pulse width of the control signal S1 of the field effect transistor 115 if the output voltage $V_{out}$ is higher than the target voltage $V_t$ (for example, 12 V). Thus, even if the output voltage $V_{out}$ changes due to the change of the load 103, the PWM controller 144 may control such that the output voltage $V_{out}$ between the output nodes N3 and N4 approaches the target voltage $V_t$ (for example, 12 V).

The voltage detection circuit 112 detects the voltage between the input nodes N1 and N2 as the input voltage $V_{in}$ of the power circuit 101. The current detection circuit 113 detects the current flowing to the input node N1 as an input current $I_{in}$ of the power circuit 101. The voltage detection circuit 124 detects the voltage between the output nodes N3 and N4 as the output voltage $V_{out}$ of the power circuit 101. The current detection circuit 123 detects the current flowing to the output node N3 as an output current $I_{out}$ of the power circuit 101.

In order to electrically isolate the voltage detection circuit 124 from an analog/digital (A/D) converter 133, the voltage detection circuit 124 is optically connected to the A/D converter 133 by a photocoupler. Further, in order to electrically isolate the current detection circuit 123 and the A/D converter 134, the current detection circuit 123 is optically connected to the A/D converter 134 by a photocoupler.

The control device 102 detects the deterioration of the power circuit 101, stops the power circuit 101, or notifies the user of the deterioration of the power circuit 101. Hereinafter, details of the control device 102 will be described.

The control unit 102 includes A/D converters 131 to 134, a memory 135, a loss resistance calculation unit 139, a target voltage generation unit 140, a subtractor 141, a compensator 142, a switch unit 143, a PWM controller 144, an initial value calculation unit 145, and a deterioration detection unit 146. The loss resistance calculation unit 139, the target voltage generation unit 140, the subtractor 141, the compensator 142, the switch unit 143, the PWM controller 144, the initial value calculation unit 145, and the deterioration detection unit 146 may be configured with hardware or software.

The A/D converter 131 converts the analog input voltage $V_{in}$ detected by the voltage detection circuit 112 into a digital input voltage $V_{in}$. The A/D converter 132 converts the analog input current $I_{in}$ detected by the current detection circuit 113 into a digital input current $I_{in}$. The A/D converter 133 converts the analog output voltage $V_{out}$ detected by the voltage detection circuit 124 into a digital output voltage $V_{out}$. The A/D converter 134 converts the analog output current $I_{out}$ detected by the current detection circuit 123 into a digital output current $I_{out}$.

The target voltage generation unit 140 stores the target voltage $V_t$ and outputs the target voltage $V_t$. The target voltage $V_t$ is 12 V, for example. The subtractor 141 subtracts the digital output voltage $V_{out}$ from the target voltage $V_t$ and outputs the subtraction result to the compensator 142. The compensator 142 calculates a duty ratio $D_a$ in accordance with the subtraction result of the subtractor 141. The duty ratio $D_a$ is a duty ratio of the control signal S1 and is expressed by $V_{out}/V_{in}$. The compensator 142 calculates the duty ratio $D_a$ such that the output voltage $V_{out}$ approaches the target voltage $V_t$. For example, the compensator 142 increases the duty ratio $D_a$ if the output voltage $V_{out}$ is lower than the target voltage $V_t$ and decreases the duty ratio $D_a$ if the output voltage $V_{out}$ is higher than the target voltage $V_t$. As the duty ratio $D_a$ increases, the pulse width of the control signal S1 widens, and the output voltage $V_{out}$ rises. When the duty ratio $D_a$ decreases, the pulse width of the control signal S1 narrows, and the output voltage $V_{out}$ decreases. By this feedback control, the output voltage $V_{out}$ may be maintained at a consistent value of the target voltage $V_t$. As described above, the subtractor 141 and the compensator 142 are duty ratio calculation units and calculate the duty ratio $D_a$ of the control signal S1 of the field effect transistor 115 of the power circuit 101 such that the output voltage $V_{out}$ approaches the target voltage $V_t$.

Figures 2, 3:
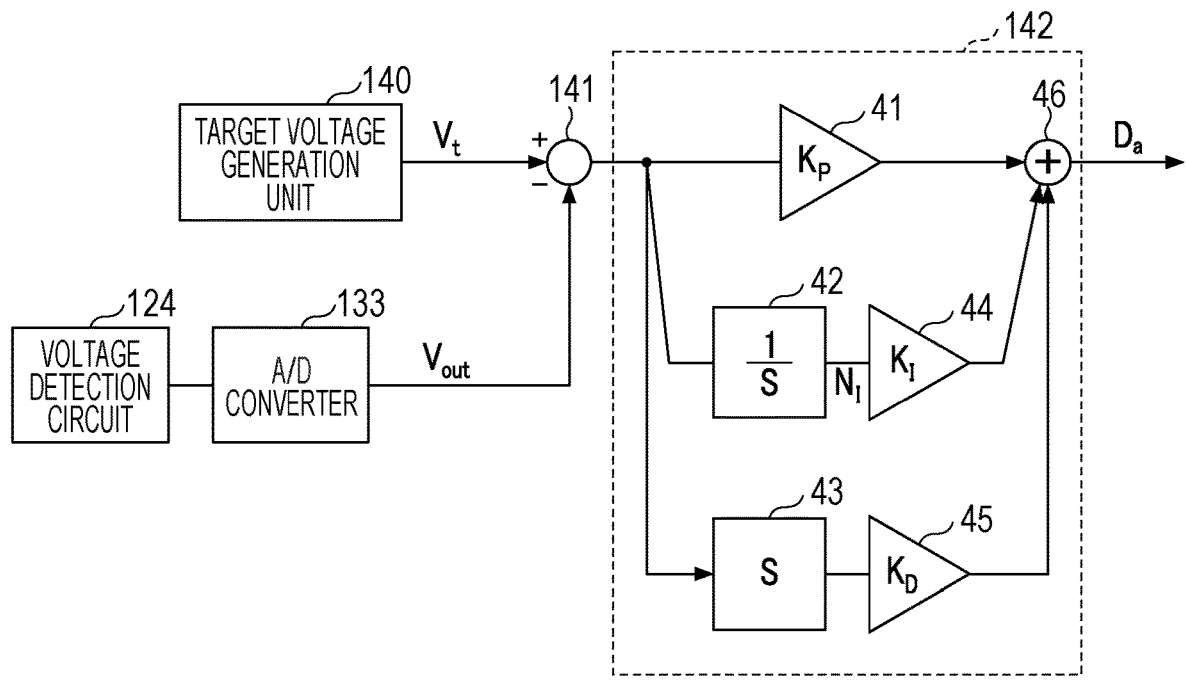
FIG. 2 is a diagram illustrating a configuration example of a compensator.
FIG. 3 is a diagram illustrating an example of a data table.

FIG. 2 is a block diagram illustrating a configuration example of the compensator 142. The compensator 142 is a controller that controls the duty ratio $D_a$ such that an error $\Delta V$ between the target voltage $V_t$ and the actual output voltage $V_{out}$ is zero. The compensator 142 is, for example, a PI controller that performs proportional-integral (PI) control, or a PID controller that performs proportional-integral-derivative (PID) control.

When operating as a PI controller, the compensator 142 includes a proportional operation unit 41, integral operation units 42 and 44, and an adder 46. In the case of the PID controller, in addition to the configuration of the PI controller, differential arithmetic units 43 and 45 are provided.

$$\text{Duty\_PID}[n] = K_P(V_t-V_{out}) + K_I\Sigma(V_t-V_{out}) + K_D \cdot \Delta(V_t-V_{out})/\Delta t \quad (1)$$

$K_P(V_t-V_{out})$ : proportional term
$K_I\Sigma(V_t-V_{out})$ : integral term
$K_D \cdot \Delta(V_t-V_{out})/\Delta t$ : derivative term $$N_I = \Sigma(V_t - V_{out}) \quad (2)$$

When acting as a PI controller, the compensator 142 determines the duty ratio $D_a$ at a certain moment as a sum of a term (proportional term: P term) proportional to $\Delta V$ at that moment and a term (integral term: I term) proportional to an integral value $N_I$ of $\Delta V$. The proportional constant of the P term is called P gain (proportional gain, $K_P$ in Equation (1)), and the proportional constant of the I term is called I gain (integral gain, $K_I$ in Equation (1)). The P term relates to a tracking speed with respect to a load change, and the I term relates to an offset amount after convergence of the change. In the case of PI control, there is no derivative term in Equation (1).

When performing PID control to further increase the tracking speed, the compensator 142 determines the duty ratio $D_a$ at a certain moment by adding a term (derivative term: D term) proportional to the differential value of $\Delta V$ at that moment to the sum of the P term and the I term at that moment. The proportional constant of the D term is called D gain (differential gain, $K_D$ in Equation (1)).

In FIG. 1, the memory 135 includes a work memory 137 and stores a program 136 and a data table 138. The program 136 is a computer-readable recording medium. In a case where the control device 102 is a microcomputer, each function of the control device 102 is realized by operating a central processing unit (CPU) in the microcomputer by the program 136 readably stored in the memory 135.

FIG. 3 is a diagram illustrating an example of the data table 138. For example, the power circuit 101 has an output voltage of 12 V and a rated output power of 500 W. The data table 138 illustrates the correspondence between the output current $I_{out}$ and a loss resistance $R_{loss}$. Details of the loss resistance $R_{loss}$ will be described later.

Figures 4, 5:
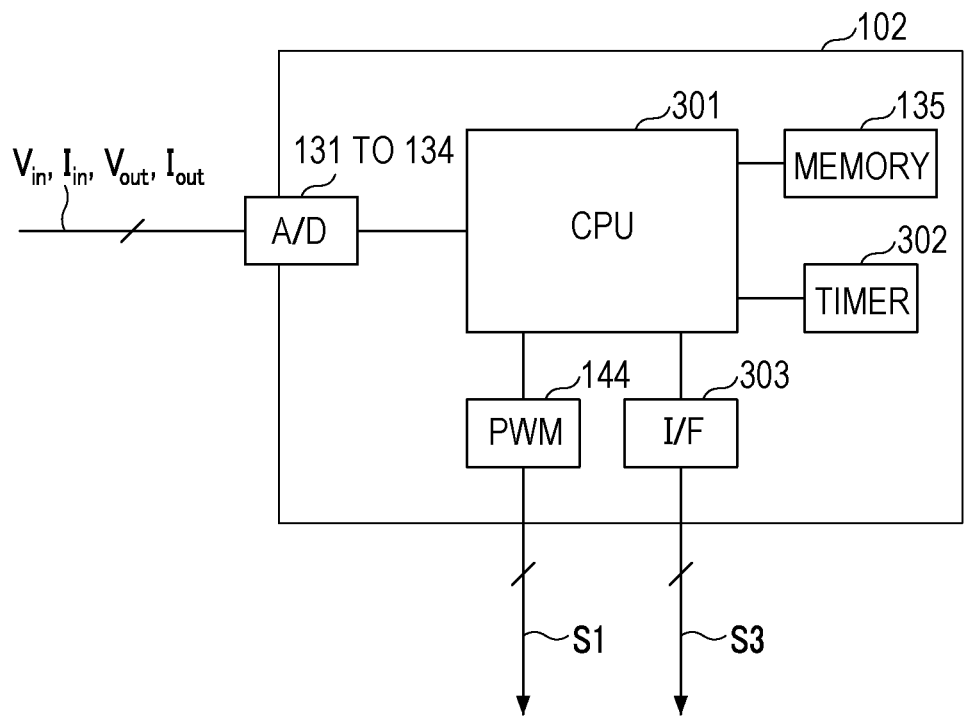
FIG. 4 is a diagram illustrating an example of a work memory.
FIG. 5 is a diagram illustrating an example of a hardware configuration of a control device.

FIG. 4 is a diagram illustrating an example of the work memory 137. For example, in the power circuit 101, the input voltage $V_{in}$ is 380 V, the target value of the output voltage $V_{out}$ is 12 V, and the rated output power is 500 W. The work memory 137 stores, for example, the correspondence between the output current $I_{out}$, the integral value $N_I$, the output voltage $V_{out}$, the input voltage $V_{in}$, and the input current I. Elements other than these may be stored. $N_{I2}$, $N_{I10}$, and $N_{I30}$ are integral values calculated by the compensator 142. Details of the integral value $N_I$ will be described later.

In FIG. 1, the loss resistance calculation unit 139 calculates the loss resistance $R_{loss}$ based on the digital input voltage $V_{in}$, the digital input current $I_{in}$, the digital output voltage $V_{out}$, and the digital output current $I_{out}$. Then, as illustrated in FIG. 3, the loss resistance calculation unit 139 writes the data table 138 indicating the correspondence between the output current $I_{out}$ and the loss resistance $R_{loss}$ in the memory 135. Details of the loss resistance calculation unit 139 will be described later.

The initial value calculation unit 145 calculates a duty ratio $D_t$ based on the loss resistance $R_{loss}$ of the data table 138, the digital input voltage $V_{in}$, the digital output voltage $V_{out}$, and the digital output current $I_{out}$. The duty ratio $D_t$ is a theoretical duty ratio (a value corresponding to an initial value of the duty ratio $D_a$) of the control signal S1. The duty ratio $D_a$ is an effective duty ratio of the control signal S1. Details of the initial value calculation unit 145 will be described later.

As illustrated in FIG. 4, the deterioration detection unit 146 writes the correspondence relationship between the output current $I_{out}$, the integral value $N_I$, the output voltage $V_{out}$, the input voltage $V_{in}$, and the input current $I_{in}$ in the work memory 137. The deterioration detection unit 146 detects the deterioration of the power circuit 101 based on the integral value $N_I$ and the output current $I_{out}$. In a case where the deterioration detection unit 146 detects the deterioration of the power circuit 101, the deterioration detection unit 146 outputs a warning signal S3 to the alarming device 104 and outputs a stop signal S2 of "1" to the switch unit 143. In a case where the deterioration detection unit 146 does not detect the deterioration of the power circuit 101, the deterioration detection unit 146 does not output the warning signal S3 to the alarming device 104 and outputs the stop signal S2 of "0" to the switch unit 143. Details of the deterioration detection unit 146 will be described later.

The control device 102 is connected to the alarming device 104 via a power management bus (PMBUS). The alarming device 104 displays warning information on deterioration of the power circuit 101 by means of a display or an LED. By recognizing the warning information, the user may replace the power circuit 101 before the power circuit 101 breaks down. As a result, the maintenance cost of the power circuit 101 may be suppressed.

In a case where the stop signal S2 is "0", the switch unit 143 outputs the duty ratio $D_a$ output from the compensator 142 to the PWM controller 144. In that case, the PWM controller 144 outputs the control signal S1 of a pulse having a pulse width of the duty ratio $D_a$ to the gate of the field effect transistor 115. The duty ratio of the control signal S1 is $D_a$. The field effect transistor 115 performs an on/off operation according to the control signal S1, and the output voltage $V_0$ is controlled to a voltage in accordance with the duty ratio $D_a$.

In a case where the stop signal S2 is "1", the switch unit 143 is in an off state and does not output the duty ratio $D_a$ output from the compensator 142 to the PWM controller 144. In that case, the PWM controller 144 outputs the low level-fixed control signal S1 having a duty ratio of 0 to the gate of the field effect transistor 115. In that case, the field effect transistor 115 maintains an off state, and the output voltage $V_{out}$ maintains 0 V. The power circuit 101 is stopped.

As described above, the deterioration detection unit 146 and the switch unit 143 are output units, and outputs the duty ratio $D_a$ to the PWM controller 144 in a case where the power circuit 101 is not deteriorated and stops the power circuit 101 in a case where the power circuit 101 is deteriorated.

FIG. 5 is a diagram illustrating an example of a hardware configuration of the control device 102. The control device 102 is, for example, a microcomputer and includes a CPU 301, a timer 302, and a communication interface 303 in addition to the A/D converters 131 to 134, the memory 135, and the PWM controller 144 described above. The CPU 301 controls the control device 201. The timer 302 counts timer values. The memory 135 stores the program 136 and the like. The CPU 301 operates according to the program 136 in the memory 135. By the operation of the CPU 301, the functions of the loss resistance calculation unit 139, the target voltage generation unit 140, the subtractor 141, the compensator 142, the switch unit 143, the initial value calculation unit 145, and the deterioration detection unit 146 in FIG. 1 are realized. The CPU 301 outputs the warning signal S3 via the communication interface 303.

Each function in the present embodiment can be provided by a program that causes a computer to realize each function. Further, each function in the present embodiment can be provided by a computer-readable recording medium recording the above program or a computer program product such as the above program. As the recording medium, for example, a flexible disk, a hard disk, an optical disk, a magneto-optical disk, a CD-ROM, a magnetic tape, a non-volatile memory card, a ROM or the like may be used.

Figure 6:
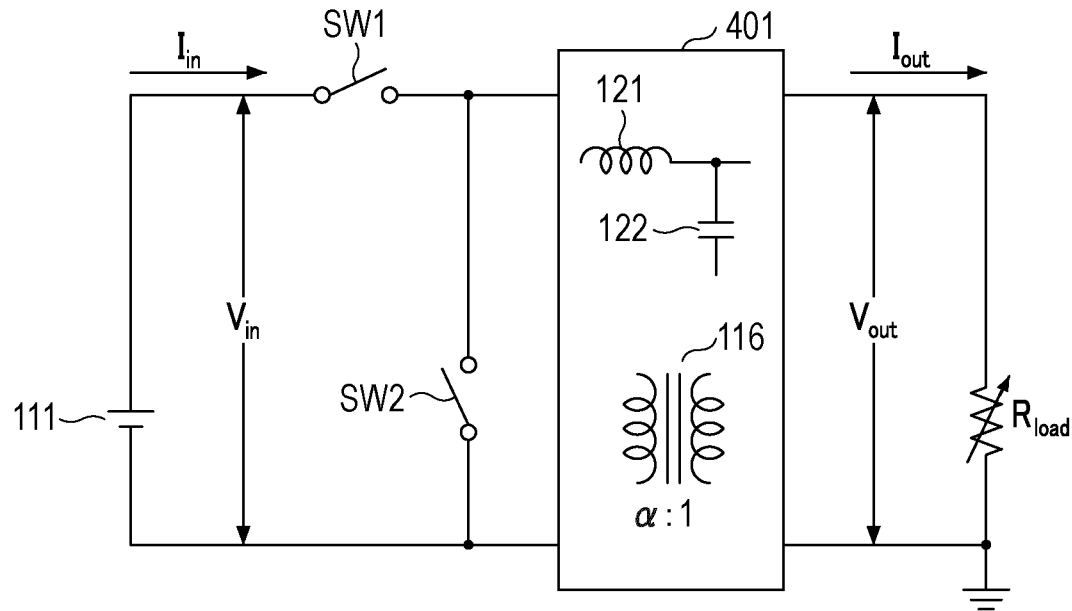
FIG. 6 is a diagram illustrating a configuration example of an equivalent circuit of a power circuit in a case where there is no loss.

FIG. 6 is a diagram illustrating an equivalent circuit of the power circuit 101 in a case where there is no loss. In a case where the field effect transistor 115 in FIG. 1 is in an on state, a switch SW1 is turned on, a switch SW2 is turned off, and the DC power supply 111 supplies energy to a circuit portion 401. In a case where the field effect transistor 115 in FIG. 1 is in the off state, the switch SW1 is turned off, the switch SW2 is turned on, and the circuit portion 401 releases energy. The circuit portion 401 includes a transformer 116, an inductor 121, an electrolytic capacitor 122, and the like. The turn ratio of the primary winding 117 and the secondary winding 118 of the transformer 116 is $\alpha$:1. The load resistance $R_{load}$ corresponds to the resistance of the load 103 in FIG. 1. The output voltage $V_{out}$ is a voltage across the load resistor $R_{load}$. In this case, the duty ratio $D_t$ is expressed by Equation (3).

$$D_t = \alpha \frac{V_{out}}{V_{in}} \quad (3)$$

In a case where there is no loss, the duty ratio $D_a$ is the same as the duty ratio $D_t$.

Figure 7:
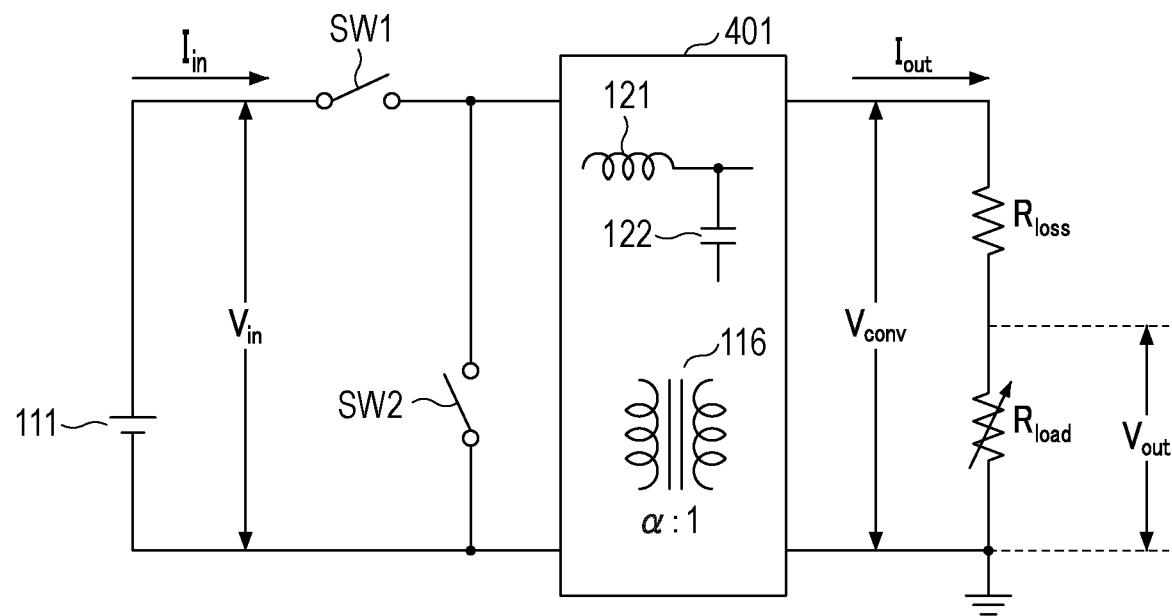
FIG. 7 is a diagram illustrating a configuration example of the equivalent circuit of the power circuit in a case where there is a loss.

FIG. 7 is a diagram illustrating an equivalent circuit of the power circuit 101 in a case where there is a loss. The equivalent circuit of FIG. 7 is obtained by adding the loss resistance $R_{loss}$ to the equivalent circuit of FIG. 6. The loss resistance $R_{loss}$ indicates an equivalent resistance corresponding to the power loss of the power circuit 101 and is connected to the load resistance, $R_{load}$ in series. The loss resistance calculation unit 139 obtains the loss resistance $R_{loss}$ by Equation (4). An input power $P_{in}$ is a product of the input voltage $V_{in}$ and the input current $I_{in}$. An output power $P_{out}$ is a product of the output voltage $V_{out}$ and the output current $I_{out}$. The loss resistance calculation unit 139 obtains the loss power by subtracting the output power $P_{out}$ from the input power $P_{in}$ and divides the loss power by the square of the output current $I_{out}$ to obtain the loss resistance $R_{loss}$ corresponding to the loss power.

$$R_{loss} = \frac{P_{in} - P_{out}}{I_{out}^2} = \frac{V_{in}I_{in} - V_{out}I_{out}}{I_{out}^2} \quad (4)$$

A voltage $V_{conv}$ is the voltage across the series connection of the loss resistor $R_{loss}$ and the load resistor $R_{load}$. The initial value calculation unit 145 calculates the duty ratio $D_t$ according to Equation (5).

$$D_t = \alpha \frac{V_{out} + R_{loss}I_{out}}{V_{in}} \quad (5)$$

Specifically, the initial value calculation unit 145 adds the output voltage $V_{out}$ to the product of the loss resistance $R_{loss}$ and the output current $I_{out}$, divides the result of the addition by the input voltage $V_{in}$, and sets the product of the result of the division and the turn ratio $\alpha$ as the duty ratio $D_t$.

A loss power $E_{loss}$ of the power circuit 101 after a sufficient time has elapsed since the load change may be approximated as $E_{loss} \approx A + B \times I_{out} + C \times I_{out}^2$ (5a).

A constant term A is a loss that does not depend on the output current Iout. For example, the constant term A includes the power consumption of the control device 102, the loss due to the leak current, the iron loss of the inductor, and the like.

A proportional term B is a loss proportional to the output current $I_{out}$. For example, the proportional term B is the switching loss of the field effect transistor 115 or the like.

A quadratic term C is a loss proportional to the square of the output current $I_{out}$. For example, the quadratic term C is the resistance loss of a substrate.

Here, it is assumed that the power circuit 101 is deteriorated and $E_{loss}$, $R_{loss}$, A, B, and C change to $E'_{loss}$, $R'_{loss}$, A', B', and C', respectively. In this case, if the efficiency is high enough, since the ratio of the duty ratio $D_t$ for a specific output current $I_{out}$ to the duty ratio $D_a$ after deterioration is $E_{loss} \ll I_{out}V_{out}$ and $E'_{loss} \ll I_{out}V_{out}$ and may be expressed as Equation (5) using a relational expression.

$$\begin{aligned} D_a/D_t &= (\alpha \times (V_{out} + R'_{loss}I_{out})/V_{in})/(\alpha \times (V_{out} + R_{loss}I_{out})/V_{in}) \quad (6) \\ &= (1 + E'_{loss}/(I_{out}V_{out}))/(1 + E_{loss}/(I_{out}V_{out})) \\ &\approx (1 + E'_{loss}/(I_{out}V_{out})) \times (1 + E_{loss}/(I_{out}V_{out})) + \\ &= 1 + (E'_{loss} - E_{loss})/(I_{out}V_{out}) + \\ &\approx 1 + ((A' - A)/I_{out} + (B' - B) + (C' - C) \cdot I_{out})/V_{out} \end{aligned}$$

Next, in the power circuit 101, the case where the resistance loss increases due to the increase of the resistance component of the power circuit 101 will be described.

The causes of the increase in the resistance component of the power circuit 101 include, for example, an increase in on-resistance due to deterioration of the field effect transistor 115, an increase in equivalent series resistance due to deterioration of the electrolytic capacitor 122, and narrowing of the wiring pattern due to corrosion of the substrate on which the power circuit 101 is mounted.

Assuming that only the resistance component of the power circuit 101 is increased due to the deterioration of the power circuit 101, A'−A=B'−B=0 in Equation (6), the ratio of duty ratio $D_a$ to $D_t$ ($D_a/D_t$) may be expressed as Equation (6).

$$D_a/D_t \approx 1 + ((A'-A)/I_{out} + (B'-B) + (C'-C) \cdot I_{out})/V_{out} = 1 + (C'-C) \cdot I_{out}/V_{out} \quad (7)$$

According to Equation (7), in a case where only the resistance component of the power circuit 101 is increased due to the deterioration of the power circuit 101, $D_a/D_t$ is proportional to the output current $I_{out}$ because a term including the output current $I_{out}$ becomes dominant.

On the other hand, in a stable state (for example, a state in which the error $\Delta V$ between the target voltage $V_t$ and the actual output voltage $V_{out}$ converges within a predetermined range) after a sufficient time has elapsed since the load change, an integral term $K_I N_I$ is dominant among the terms on the right side of Equation (1). Since a proportional constant $K_I$ of the integral term is fixed, when $N_I$ after deterioration is $N_I'$, $D_a/D_t$ may be approximated as $N_I'/N_I$ in a stable state after a sufficient time has elapsed since the load change.

$N_I'/N_I$ is proportional to the output current $I_{out}$. Therefore, it is possible to detect an increase in the resistance component of the power circuit 101 by evaluating the difference between before and after the deterioration of the integral value $N_I$ for the specific output current $I_{out}$. Alternatively, it is possible to detect an increase in the resistance component of the power circuit 101 by evaluating the difference between before and after the deterioration of the slope of the integral value $N_I$ with respect to the output current $I_{out}$.

Figure 8:
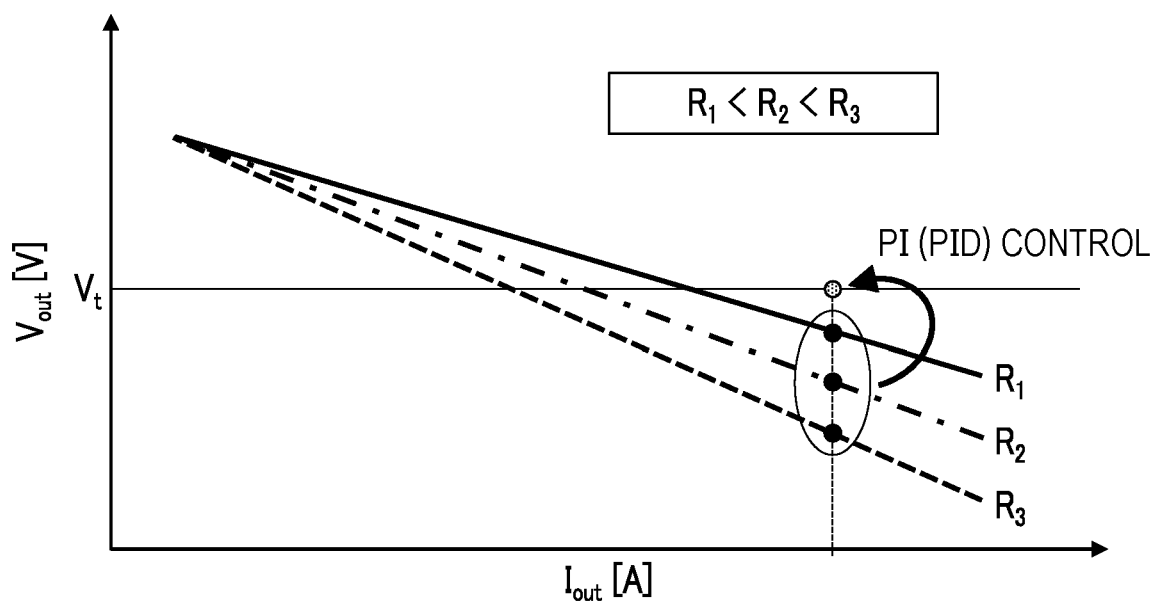
FIG. 8 is a diagram illustrating an example of a relationship between an output voltage and an output current due to a change in a resistance component.

FIG. 8 is a diagram illustrating an example of the relationship between the output voltage $V_{out}$ and the output current $I_{out}$ due to the difference in the resistance component of the power circuit 101. The compensator 142 performs PI control or PID control of calculating the duty ratio $D_a$ such that the output voltage $V_{out}$ becomes the target voltage $V_t$ even if the resistance component of the power circuit 101 deteriorates differently from $R_1$, $R_2$, and $R_3$, respectively. In the present embodiment, since the current dependency of the integral value $N_I$ in PI control or PID control is used, it is possible to detect a change in the resistance component R of the power circuit 101 with higher sensitivity by getting rid of the influence of a sudden change in the load.

Figure 9:
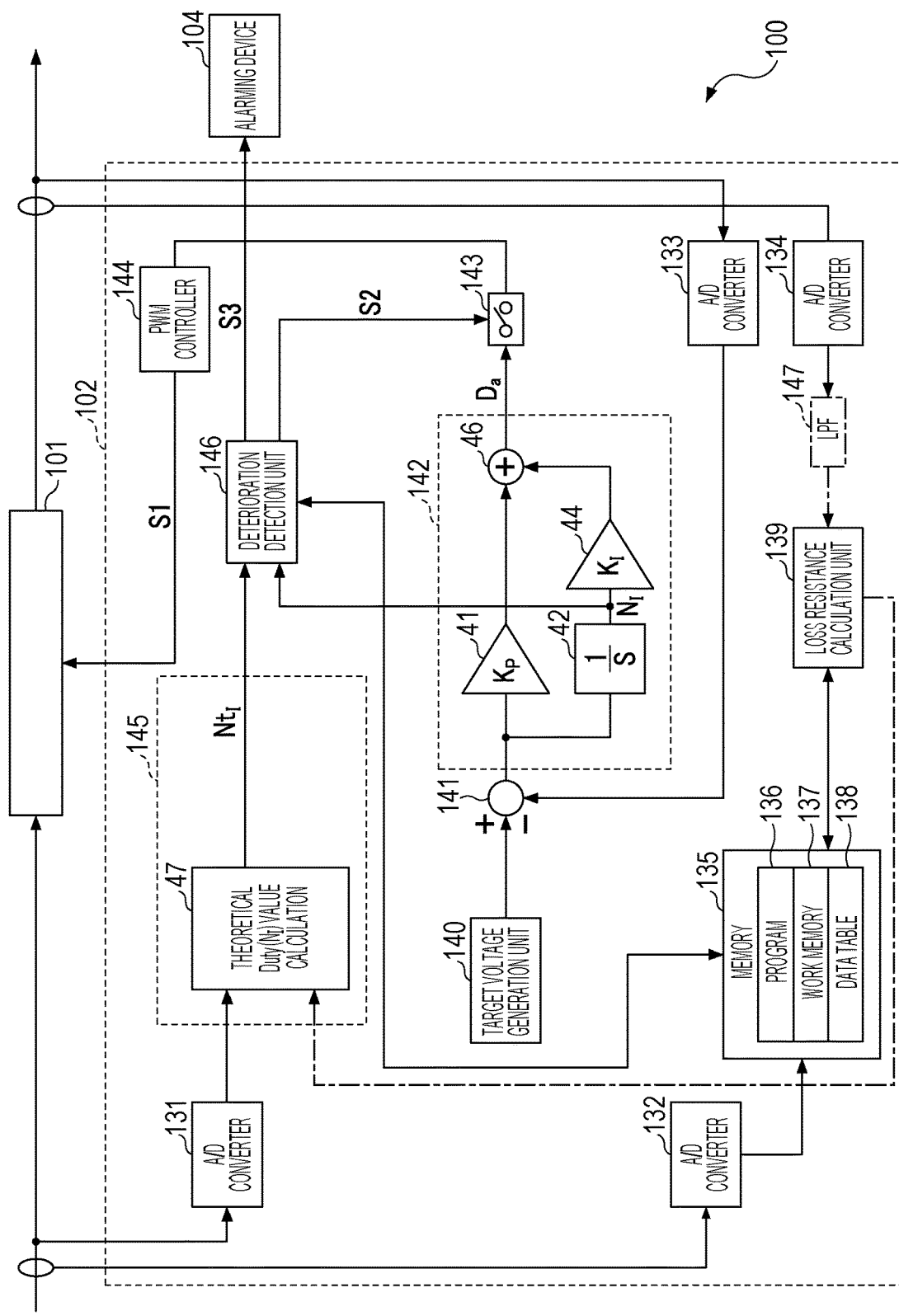
FIG. 9 is a diagram illustrating a detailed configuration example of the power apparatus.

FIG. 9 is a diagram illustrating a detailed configuration example of the power apparatus 100.

In order to suppress an increase in the errors of the calculation result of the loss resistance $R_{loss}$ due to the change of the output current $I_{out}$, a low pass filter (LPF) 147 smoothes the digital output current $I_{out}$ generated by the A/D converter 134 and outputs the smoothed signal to the loss resistance calculation unit 139.

The initial value calculation unit 145 has a theoretical value calculation unit 47. The theoretical value calculation unit 47 calculates an integral value $Nt_I$ based on the duty ratio $D_t$ calculated based on Equation (5) and the integral gain $K_I$ described above. The integral value $Nt_I$ is a theoretical value (value corresponding to the initial value of the integral value $N_I$) of the integral value $N_I$. In a stable state (for example, a state in which the error $\Delta V$ between the target voltage $V_t$ and the actual output voltage $V_{out}$ converges within a predetermined range) after a sufficient time has elapsed since the load change, an integral term $K_I N_I$ is dominant among the terms on the right side of Equation (1). Since the proportional constant $K_I$ of the integral term is fixed, the following relational expressions hold.

$$D_t = K_I N t_I \tag{8a}$$

$$Nt_I = D_t / K_I \tag{8b}$$

That is, the theoretical value calculation unit 47 may calculate an integral value $Nt_I$ (an initial value of the integral value $N_I$) for the specific output current $I_{out}$ according to Equation (8b). Further, the theoretical value calculation unit 47 may calculate the slope of the integral value $Nt_I$ with respect to the output current $I_{out}$ from a plurality of integral values $Nt_I$ calculated by using Equation (8b) for each of the plurality of output currents $I_{out}$.

Figure 10:
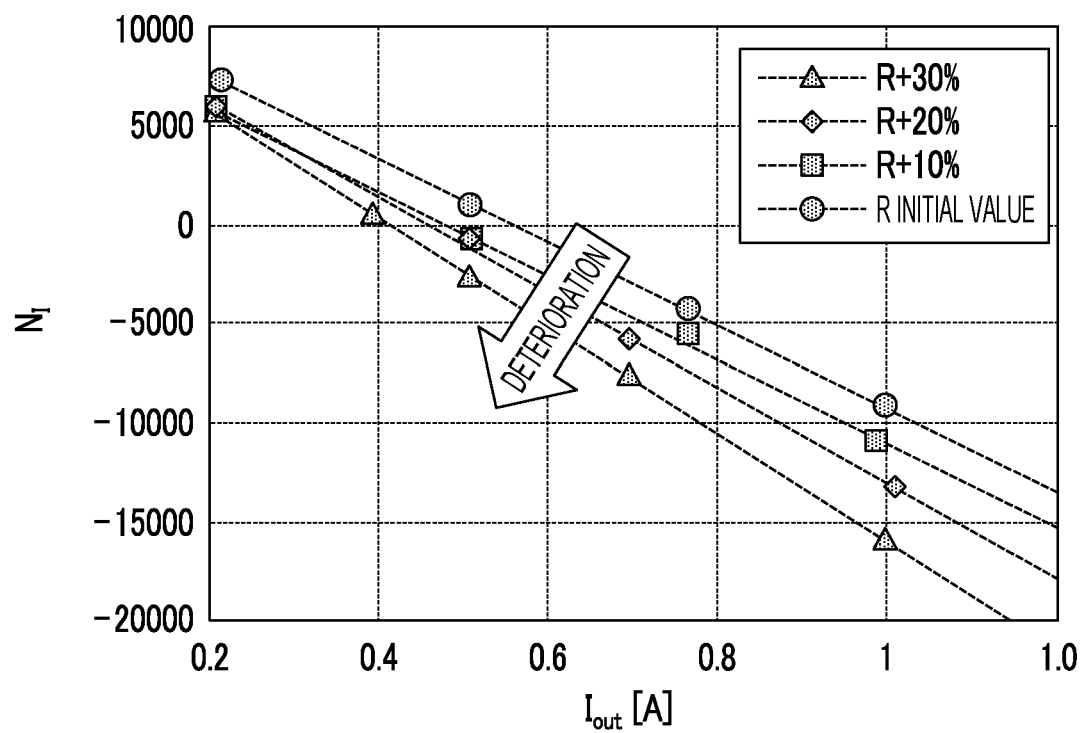
FIG. 10 is a diagram illustrating an example of a relationship between an integral value and the output current.

FIG. 10 is a diagram illustrating an example of the relationship between the integral value $N_I$ and the output current $I_{out}$ due to the difference in the resistance component R of the power circuit 101.

As illustrated in FIG. 10, the absolute value of the integral value $N_I$ is proportional to the output current $I_{out}$ within a range where the output current $I_{out}$ is greater than a predetermined current threshold, and as the resistance component R of the power circuit 101 increases, the absolute value of the integral value $N_I$ for the specific output current $I_{out}$ is increased. Therefore, the deterioration detection unit 146 may detect an increase in the resistance component R of the power circuit 101 by detecting a change in the integral value $N_I$ for the specific output current $I_{out}$. For example, in a case where the integral value $N_I$ for the specific output current $I_{out}$ changes by a predetermined change amount or more with respect to the integral value $Nt_I$ for the same specific output current $I_{out}$, the deterioration detection unit 146 may determine that the resistance component R of the power circuit 101 is increased due to the deterioration of the power circuit 101.

FIG. 11 is a diagram illustrating an example of the relationship between the resistance component R of the power circuit 101 and a threshold (warning threshold or stop threshold) of the integral value $N_I$ at a rated maximum output (when the specific output current $I_{out}$ is 1 amp). At the time of creation of the power circuit 101, the threshold of the integral value $N_I$ at the rated maximum output is stored in advance in the memory 135 in association with each resistance component R as a threshold at which the resistance loss increases. In a case where it is detected that the integral value $N_I$ at the rated maximum output obtained from the compensator 142 exceeds each threshold stored in the memory 135, the deterioration detection unit 146 outputs at least one of the warning signal S3 and the stop signal S2 according to each threshold. Thus, a warning may be given to the user according to the degree of deterioration of the power circuit 101, or the power circuit 101 may be stopped according to the degree of deterioration of the power circuit 101.

In the case of cooling a normal power supply, the cooling capacity thereof is designed with a margin of about +20%. Therefore, for example, in the case of a power supply with a rated maximum output 1 amp, it is preferable to output a warning signal for a primary alarm when the resistance component R increases by 10% and output a warning signal for a secondary alarm when the resistance component R increases by 15%. Thus, it is possible to detect the deterioration in which the resistance component R increases and to notify the user of the deterioration before the heat generation from the power supply exceeds a cooling margin.

As illustrated in FIG. 10, as the resistance component R of the power circuit 101 increases within a range where the output current $I_{out}$ is greater than the predetermined current threshold, the slope of the integral value $N_I$ with respect to the output current $I_{out}$ increases. Therefore, the deterioration detection unit 146 may detect an increase in the resistance component R of the power circuit 101 by detecting a change in the slope of the integral value $N_I$ with respect to the output current $I_{out}$. For example, the case where the slope of the integral value $N_I$ with respect to the output current $I_{out}$ in a specific range changes by a predetermined change amount or more with respect to the slope of the integral value $Nt_I$ with respect to the output current $I_{out}$ in the same range is considered. In this case, the deterioration detection unit 146 may determine that the resistance component R of the power circuit 101 is increased due to the deterioration of the power circuit 101.

FIG. 12 is a diagram illustrating an example of the relationship between the resistance component R of the power circuit 101 and the threshold (warning threshold or stop threshold) of the slope of the integral value $N_I$ with respect to the output current $I_{out}$ at least two points. At the time of creation of the power circuit 101, a threshold of the slope of the integral value $N_I$ with respect to the output current $I_{out}$ is stored in advance in the memory 135 in association with each resistance component R as a threshold at which the resistance loss increases. The deterioration detection unit 146 uses a plurality of integral values $N_I$ (the integral values with respect to the output current $I_{out}$ at least two points) acquired from the compensator 142 to calculate the slope of the integral value $N_I$. In a case where it is detected that the value (calculated value of the slope) obtained by calculating the slop exceeds each threshold stored in the memory 135, the deterioration detection unit 146 outputs at least one of the warning signal S3 and the stop signal S2 according to each threshold. Thus, a warning may be given to the user according to the degree of deterioration of the power circuit 101, or the power circuit 101 may be stopped according to the degree of deterioration of the power circuit 101.

As described above, in the case of cooling the normal power supply is cooled, the cooling capacity thereof is designed with a margin of about +20%. Therefore, for example, in the case of a power supply with a rated maximum output 1 amp, it is preferable to output a warning signal for a primary alarm when the resistance component R increases by 10% and output a warning signal for a secondary alarm when the resistance component R increases by 15%. Thus, it is possible to detect the deterioration in which the resistance component R increases and to notify the user of the deterioration before the heat generation from the power supply exceeds a cooling margin.

Next, in the power circuit 101, a case where the switching loss increases due to a speed decrease of the switching element (specifically, the field effect transistor 115) of the power circuit 101 will be described.

Assuming that only the switching loss is increased due to the deterioration of the power circuit 101, A'−A=C'−C=0 in Equation (6), and therefore, the ratio ($D_a/D_t$) of the duty ratio $D_a$ to $D_t$ may be expressed as Equation (7).

$$D_a/D_t \approx 1+((A'-A)/I_{out}+(B'-B)+(C'-C)\cdot I_{out})/V_{out}=1+(B'-B)/V_{out} \quad (9)$$

According to Equation (9), in a case where only the switching loss is increased due to the deterioration of the power circuit 101, $D_a/D_t$ is substantially fixed regardless of the output current $I_{out}$.

On the other hand, in a stable state (for example, a state in which the error $\Delta V$ between the target voltage $V_t$ and the actual output voltage $V_{out}$ converges within a predetermined range) after a sufficient time has elapsed since the load change, an integral term $K_I N_I$ is dominant among the terms on the right side of Equation (1). Since a proportional constant $K_I$ of the integral term is fixed, when $N_I$ after deterioration is $N_I'$, $D_a/D_t$ may be approximated as $N_I'/N_I$ in a stable state after a sufficient time has elapsed since the load change.

$N_I'/N_I$ is proportional to the output current Tout. Therefore, it is possible to detect a decrease in switching speed, that is, an increase in switching loss, by evaluating the difference between before and after deterioration of the integral value $N_I$ for the specific output current $I_{out}$.

Figure 13:
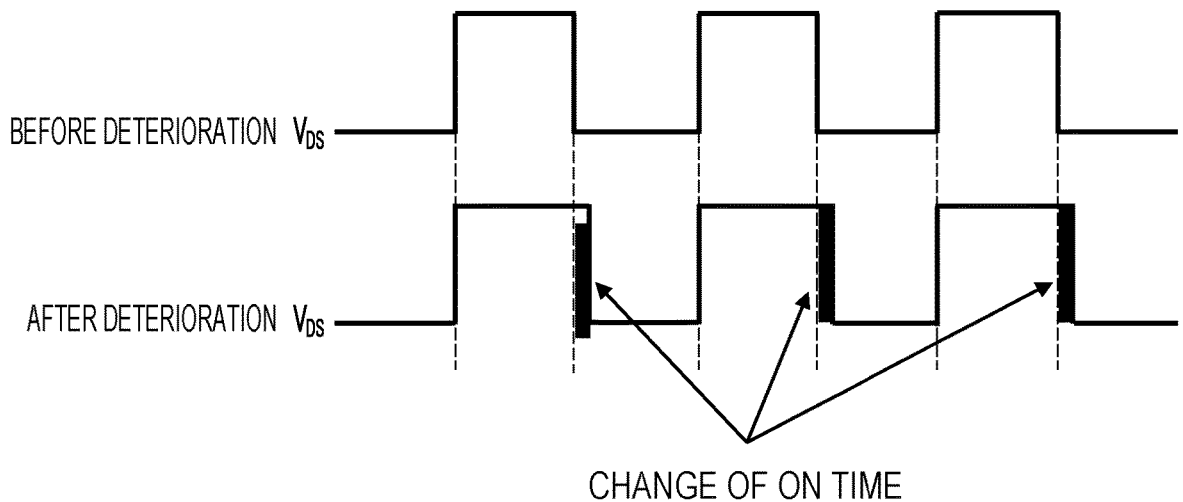
FIG. 13 is a diagram illustrating a speed decrease a switching element.

FIG. 13 is a diagram illustrating a speed decrease of a switching element. $N_{DS}$ represents the drain-source voltage of the MOS field effect transistor. As the switching speed decreases due to the aging of the switching element, on-time changes. From the point of view of the overall power supply, a decrease in switching speed is equivalent to an increase in on-time. The change in on-time due to the deterioration is as short as several nanoseconds, and it is difficult to directly detect the on-time.

Figure 14:
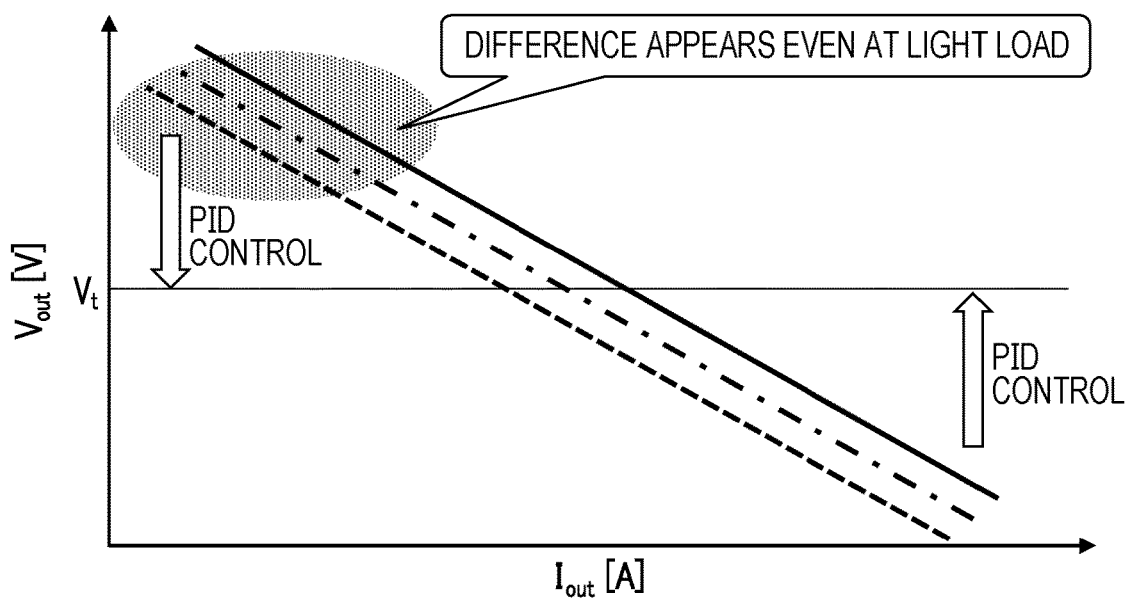
FIG. 14 is a diagram illustrating an example of the relationship between the output voltage and the output current due to the speed decrease of the switching element.

FIG. 14 is a diagram illustrating an example of the relationship between the output voltage $V_{out}$ and the output current $I_{out}$ due to the difference in the speed decrease of the switching element. The compensator 142 performs PI control or PID control of calculating the duty ratio $D_a$ such that the output voltage $V_{out}$ becomes the target voltage $V_t$, even in a degradation state in which the speed decrease of the switching element is different. As illustrated, the difference in the speed decrease of the switching element appears even under a light load. In present embodiment, since the integral value $N_I$ in PI control or PID control is used, a small change that may not be directly detected may be amplified and captured, and it is possible to detect the speed decrease of the switching element with higher sensitivity.

Figures 15, 16:
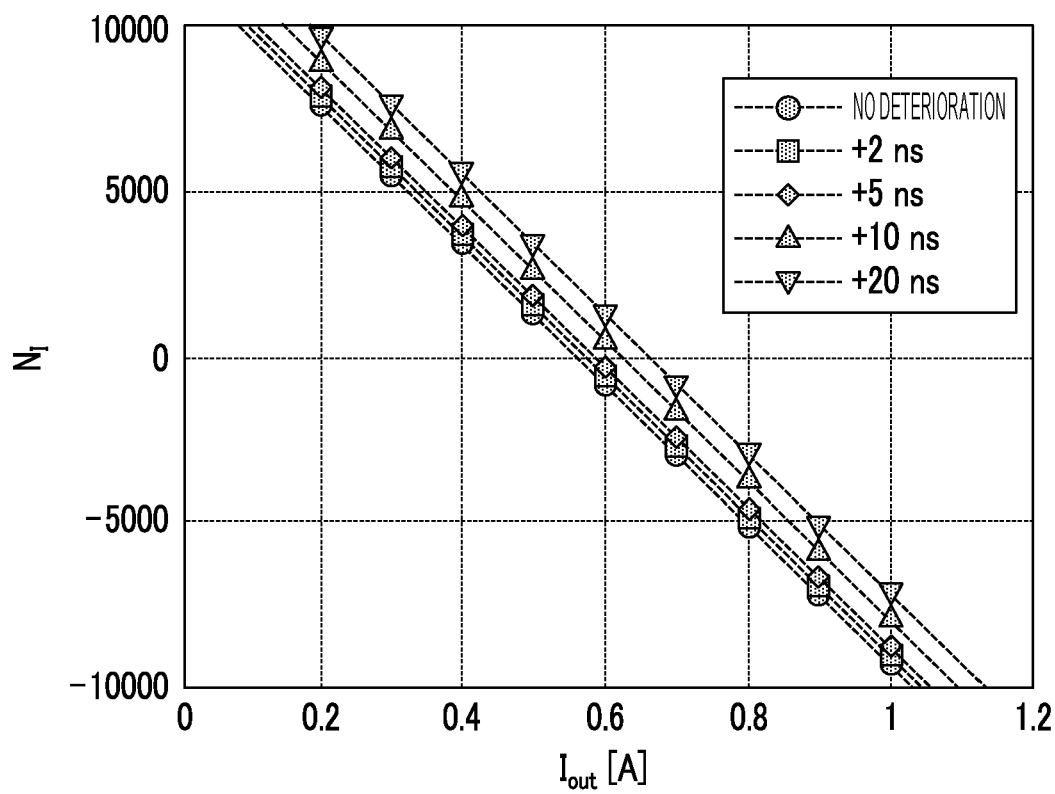
FIG. 15 is a diagram illustrating an example of the relationship between the integral value and the output current.
FIG. 16 is a diagram illustrating an example of the integral value and a slope thereof.

FIG. 15 is a diagram illustrating an example of the relationship between the integral value $N_I$ and the output current $I_{out}$ due to the difference in the speed decrease of the switching element.

As illustrated in FIG. 15, the absolute value of the integral value $N_I$ is proportional to the output current $I_{out}$, and as the amount of the speed decrease (deceleration amount) of the switching element increases, the absolute value of the integral value $N_I$ for the specific output current $I_{out}$ increases.

Therefore, the deterioration detection unit 146 may detect the speed decrease of the switching element by detecting the change of the integral value $N_I$ for the specific output current $I_{out}$. For example, in a case where the integral value $N_I$ for the specific output current $I_{out}$ changes by a predetermined change amount or more with respect to the integral value $Nt_I$ for the same output current $I_{out}$, the deterioration detection unit 146 may determine that the speed of the switching element is decreased due to the deterioration of the power circuit 101. Further, in the case of the increase of switching loss due to the speed decrease of the switching element, since the slope of the integral value $N_I$ has no current dependency (that is, the slope of the integral value $N_I$ with respect to the output current $I_{out}$ does not substantially change), it is distinguishable from the case of the increase of the resistance loss due to the increase of the resistance component R.

FIG. 16 is a diagram illustrating an example of the relationship between the amount of deceleration of the switching element and the threshold (warning threshold or stop threshold) of the integral value $N_I$. At the time of creation of the power circuit 101, the threshold of the integral value $N_I$ for the specific output current $I_{out}$ is stored in advance in the memory 135 in association with each resistance component R as a threshold at which the switching loss increases. In a case where it is detected that the integral value $N_I$ for the same specific output current $I_{out}$ obtained from the compensator 142 exceeds each threshold stored in the memory 135, the deterioration detection unit 146 outputs at least one of the warning signal S3 and the stop signal S2 according to each threshold. Thus, a warning may be given to the user according to the degree of deterioration of the power circuit 101, or the power circuit 101 may be stopped according to the degree of deterioration of the power circuit 101.

In the case of cooling a normal power supply, the cooling capacity thereof is designed with a margin of about +20%. Therefore, for example, it is preferable to output a warning signal for a primary alarm when the amount of deceleration of the switching element increases by 10%, and output a warning signal for a secondary alarm when the amount of deceleration increases by 15%. As a result, it is possible to detect deterioration in which the speed of the switching element decreases and to notify the user of the deterioration before heat generation from the power supply exceeds the cooling margin.

Figure 17:
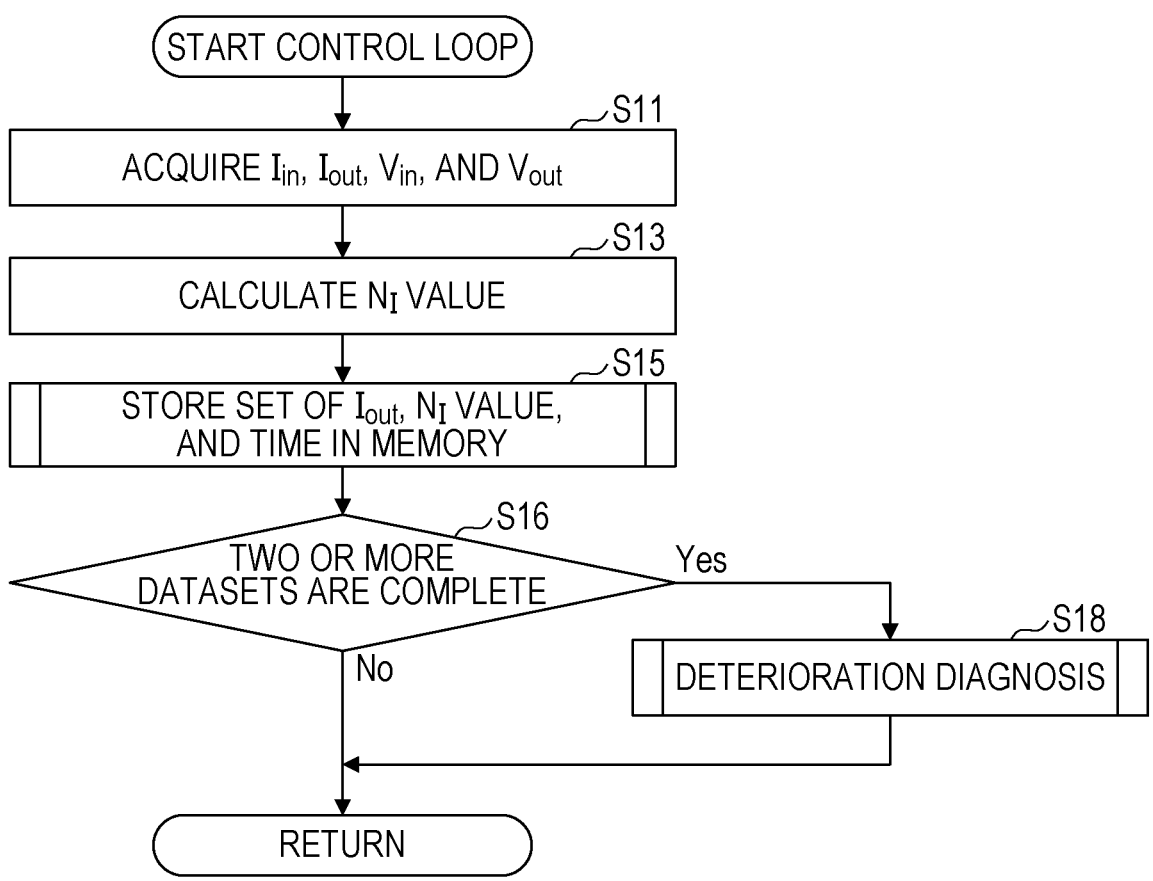
FIG. 17 is a diagram illustrating an example of a flowchart of pre-deterioration diagnosis processing.

FIG. 17 is a flowchart of the deterioration diagnosis pre-processing performed by the control device 102.

In operation S11, the control device 102 acquires the input current $I_{in}$, the output current $I_{out}$, the input voltage $V_{in}$, and the output voltage $V_{out}$ by the A/D converters 131 to 134.

In operation S13, the compensator 142 calculates the duty ratio $D_a$ by calculating the proportional term and the integral term in the case of PI control according to Equation (1) and calculates the duty ratio $D_a$ by calculating the proportional term, the integral term, and the derivative term in the case of PID control. The compensator 142 calculates an integral value $N_I$ in the process of calculating the integral term.

In operation S15, the deterioration detection unit 146 writes the plurality of integral values $N_I$ for each of the plurality of output currents $I_{out}$ in the work memory 137 (see FIG. 4).

In operation S16, it is determined whether two or more data sets of the output current $I_{out}$ and the integral value $N_I$ are stored in the work memory 137. In a case where two or more data sets are stored, it is possible to calculate the slope of the integral value $N_I$ with respect to the output current $I_{out}$.

The calculated value of the slope of the integral value $N_I$ with respect to the output current $I_{out}$ is used in the deterioration diagnosis processing of operation S18. Therefore, the deterioration detection unit 146 executes the deterioration diagnosis processing (see FIG. 18) in operation S18 after two or more data sets of the output current $I_{out}$ and the integral value $N_I$ are stored.

Figure 18:
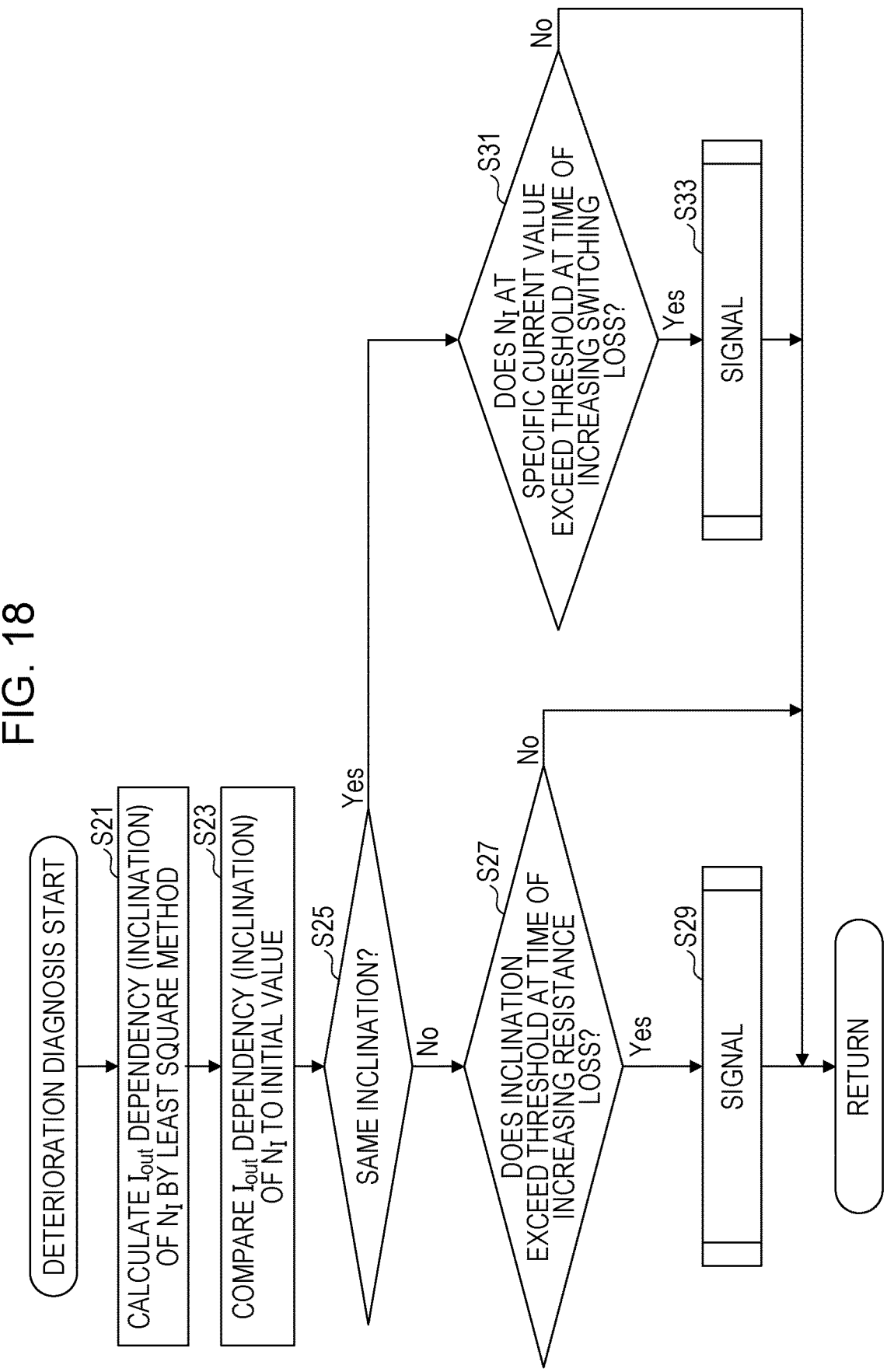
FIG. 18 is a diagram illustrating an example of a flowchart of deterioration diagnosis processing.

FIG. 18 is a flowchart of the deterioration diagnosis processing performed by the control device 102.

In operation S21, the deterioration detection unit 146 uses a plurality of data sets stored in the work memory 137 in operation S15 and calculates the slope of the integral value $N_I$ with respect to the output current $I_{out}$ by using the method of least squares. In operation S23, the deterioration detection unit 146 compares the calculated value of the slope of integral value $N_I$ with respect to the output current $I_{out}$ with the initial value (the slope of the integral value $Nt_I$ with respect to the output current $I_{out}$) calculated by theoretical value calculation unit 47, and then determines whether or not the calculated value of the slope is the same as the initial value.

In a case where it is determined in operation S25 that the calculated value of the slope is different from the initial value, the deterioration detection unit 146 executes the processing of operation S27. In a case where the calculated value of the slope is different from the initial value, it may be estimated that the resistance component R of the power circuit 101 is increasing, and therefore, the threshold at which the resistance loss increases is selected. In operation S27, the deterioration detection unit 146 determines whether or not the calculated value of the slope exceeds the threshold at which the resistance loss increases (first warning threshold, for example, "−24041" illustrated in FIG. 12). The deterioration detection unit 146 outputs the first warning signal S3 to the alarming device 104 when the calculated value of the slope exceeds a first warning threshold (operation S29). Thus, the user may recognize that the power circuit 101 is in a lightly deteriorated state due to the increase of the resistance component R.

In operation S27, when the calculated value of the slope exceeds a first stop threshold (for example, "−20974" illustrated in FIG. 12) greater than the first warning threshold, the deterioration detection unit 146 outputs the stop signal S2 of "1" to the switch unit 143 (operation S29). Thus, the power circuit 101 may be stopped. In operation S27, when the calculated value of the slope exceeds the first stop threshold (for example, "−20974" illustrated in FIG. 12) greater than the first warning threshold, the deterioration detection unit 146 may output the warning signal S3 different from the first warning signal to the alarming device 104 (operation S29). Thus, the user can recognize that the power circuit 101 is in a heavily deteriorated state due to the increase of the resistance component R.

On the other hand, in operation S27, when the calculated value of the slope does not exceed the first warning threshold, the deterioration detection unit 146 does not output the warning signal S3 to the alarming device 104 and outputs the stop signal S2 of "0" to the switch unit 143. As a result, since no warning is given to the user and the control signal S1 of the duty ratio $D_a$ is output to the power circuit 101, the power circuit 101 continues to operate so that the output voltage $V_{out}$ is maintained at the target voltage.

On the other hand, in a case where it is determined that the calculated value of the slope is the same as the initial value in operation S25, the deterioration detection unit 146 executes the processing of operation S31. In a case where the calculated value of the slope is the same as the initial value, a threshold at which the switching loss increases is selected. In operation S31, the deterioration detection unit 146 determines whether or not the calculated value of the slope exceeds a threshold (second warning threshold, for example, "1493" illustrated in FIG. 16) at which the switching loss increases.

The deterioration detection unit 146 outputs the second warning signal S3 to the alarming device 104 when the calculated value of the slope exceeds a second warning threshold (operation S33). As a result, the user may recognize that the power circuit 101 is in a lightly deteriorated state due to the speed decrease of the switching element.

In operation S31, when the calculated value of the slope exceeds a second stop threshold (for example, "3328" illustrated in FIG. 16) greater than the second warning threshold, the deterioration detection unit 146 outputs the stop signal S2 of "1" to the switch unit 143 (operation S33). Thus, the power circuit 101 may be stopped. In the operation S31, when the calculated value of the slope exceeds the second stop threshold (for example, "3328" illustrated in FIG. 16) greater than the second warning threshold, the deterioration detection unit 146 may output the warning signal S3 different from the second warning signal to the alarming device 104 (operation S33). As a result, the user may recognize that the power circuit 101 is in a heavily deteriorated state due to the speed decrease of the switching element.

On the other hand, in operation S31, when the calculated value of the slope does not exceed the second warning threshold, the deterioration detection unit 146 does not output the warning signal S3 to the alarming device 104 and outputs the stop signal S2 of "0" to the switch unit 143. As a result, since no warning is given to the user and the control signal S1 of the duty ratio $D_a$ is output to the power circuit 101, the power circuit 101 continues to operate so that the output voltage $V_{out}$ is maintained at the target voltage.

Although the computer-readable recording medium and the power circuit have been described above by the embodiment, the present disclosure is not limited to the above embodiment. Various modifications and improvements, such as combinations or replacements with part or all of the other embodiments, are possible within the scope of the present disclosure.

For example, in the above-described embodiment, the integral value is $N_I$ as represented by Equation (2), but $K_I N_I$ (that is, the integral term of Equation (1)) may be treated as an integral value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power apparatus comprising:
   a power circuit configured to receive an input voltage and generate an output voltage;
   a memory; and
   a processor coupled to the memory and the processor configured to:
   calculate an integral value of an error between the output voltage and a target voltage of the power circuit;

calculate a duty ratio based on the integral value, the power circuit being controlled according to the calculated duty ratio so that the output voltage becomes the target voltage;

calculate a slope of the integral value with respect to an output current of the power circuit; and generate a first warning signal when the calculated slope exceeds a first warning threshold in a case where the calculated slope is different from an initial value.

2. The power apparatus according to claim 1, the processor further configured to:

generate a control signal to control the power circuit with the calculated duty ratio when the calculated slope does not exceed the first warning threshold in a case where the calculated slope is different from the initial value.

3. The power apparatus according to claim 1, the processor further configured to:

control the power circuit to stop generating the output voltage when the calculated slope exceeds a first stop threshold greater than the first warning threshold in a case where the calculated slope is different from the initial value.

4. The power apparatus according to claim 1, the processor further configured to:

generate a second warning signal when the calculated slope exceeds a second warning threshold in a case where the calculated slope is the same as the initial value.

5. The power apparatus according to claim 4, the processor further configured to:

generate a control signal to control the power circuit with the calculated duty ratio when the calculated slope does not exceed the second warning threshold in a case where the calculated slope is the same as the initial value.

6. The power apparatus according to claim 4, the processor further configured to:

control the power circuit to stop generating the output voltage when the calculated slope exceeds a second stop threshold greater than the second warning threshold in a case where the calculated slope is the same as the initial value.

7. A non-transitory computer-readable recording medium storing a program that causes a computer to execute a procedure, the procedure comprising:

calculating an integral value of an error between an output voltage and a target voltage of a power circuit configured to receive an input voltage and generate the output voltage;

calculating a duty ratio based on the integral value, the power circuit being controlled according to the calculated duty ratio so that the output voltage becomes the target voltage;

calculating a slope of the integral value with respect to an output current of the power circuit; and generating a first warning signal when the calculated slope exceeds a first warning threshold in a case where the calculated slope is different from an initial value.

8. The non-transitory computer-readable recording medium according to claim 7, the procedure further comprising:

generating a control signal to control the power circuit with the calculated duty ratio when the calculated slope does not exceed the first warning threshold in a case where the calculated slope is different from the initial value.

9. The non-transitory computer-readable recording medium according to claim 7, the procedure further comprising:

controlling the power circuit to stop generating the output voltage when the calculated slope exceeds a first stop threshold greater than the first warning threshold in a case where the calculated slope is different from the initial value.

10. The non-transitory computer-readable recording medium according to claim 1, the procedure further comprising:

generating a second warning signal when the calculated slope exceeds a second warning threshold in a case where the calculated slope is the same as the initial value.

11. The non-transitory computer-readable recording medium according to claim 10, the procedure further comprising:

generating a control signal to control the power circuit with the calculated duty ratio when the calculated slope does not exceed the second warning threshold in a case where the calculated slope is the same as the initial value.

12. The non-transitory computer-readable recording medium according to claim 10, the procedure further comprising:

controlling the power circuit to stop generating the output voltage when the calculated slope exceeds a second stop threshold greater than the second warning threshold in a case where the calculated slope is the same as the initial value.

* * * * *